Sept. 23, 1952 P. G. PALMGREN 2,611,670
ROLLER BEARING CAGE WITH CLOSED-IN FACE SLOT
Filed March 21, 1949 4 Sheets-Sheet 1
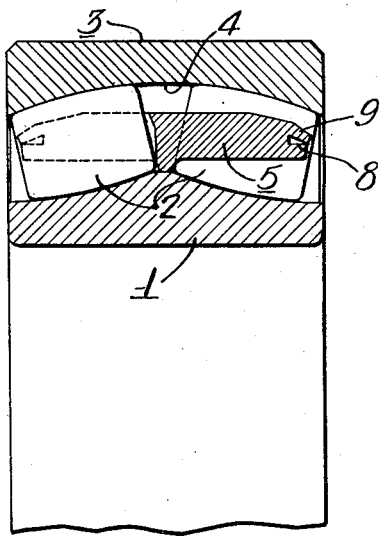
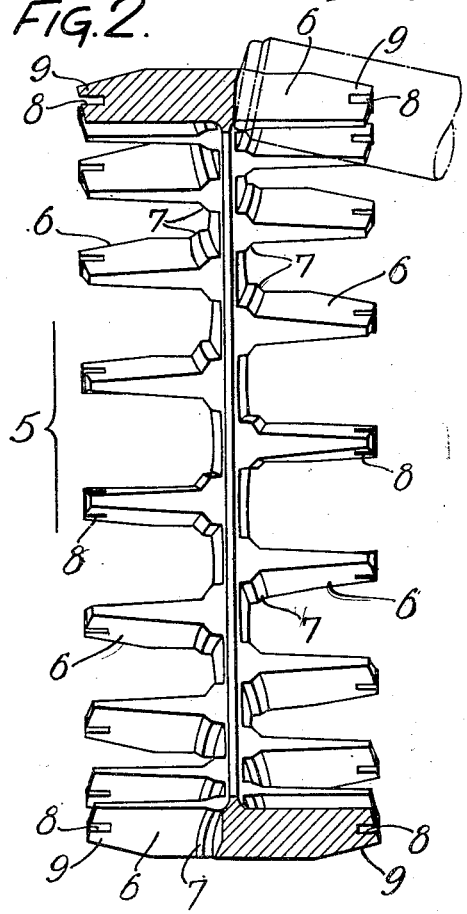
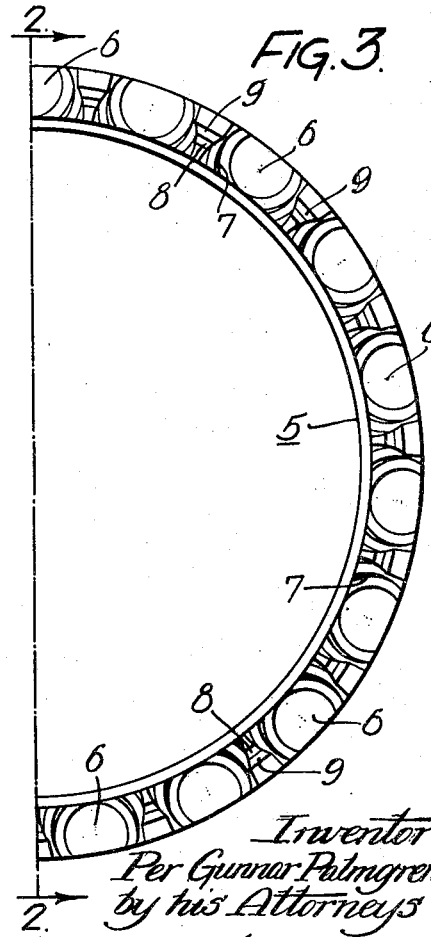
Inventor:
Per Gunnar Palmgren
by his Attorneys
Howson & Howson

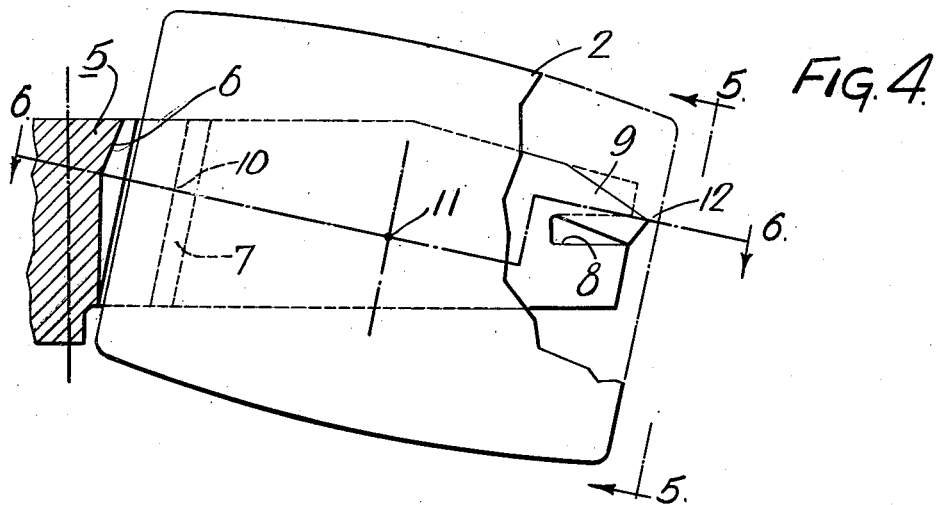
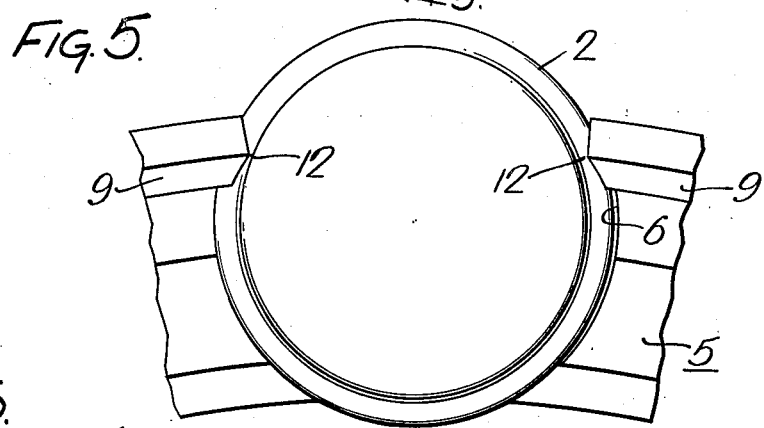
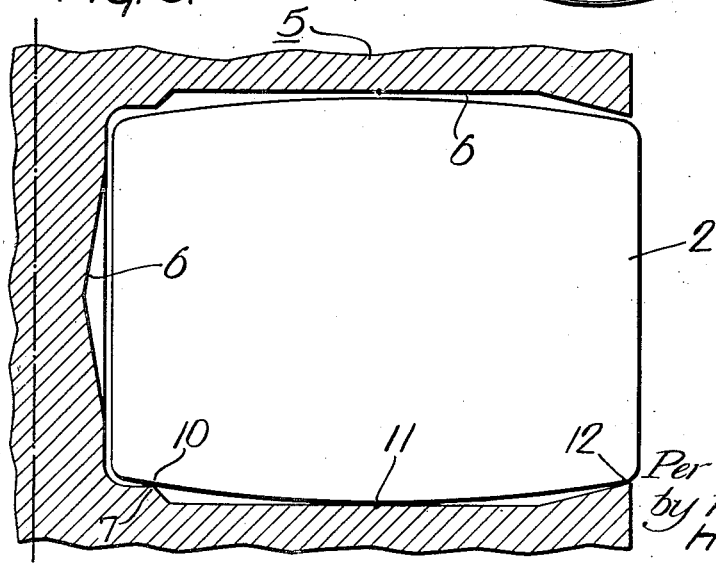

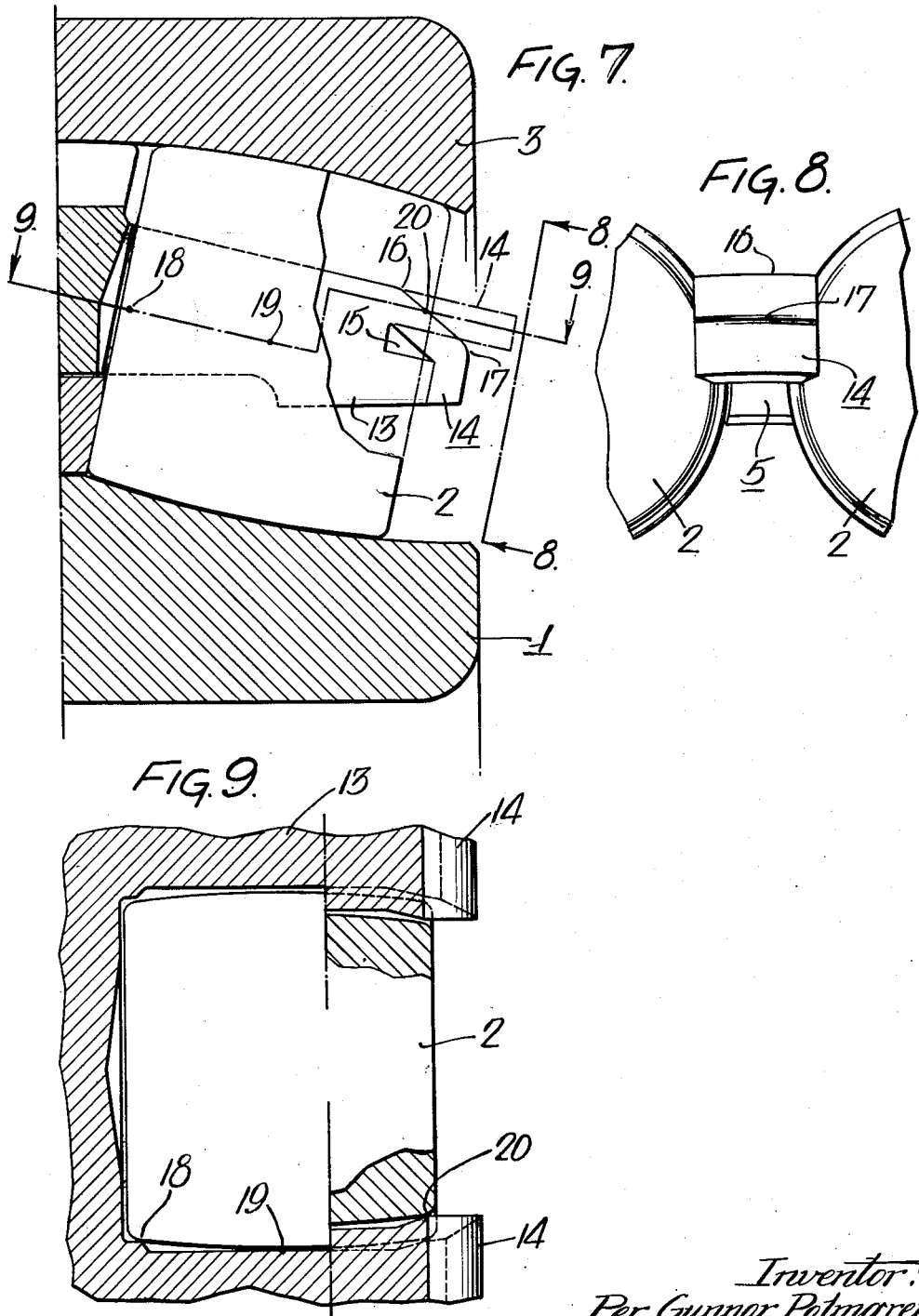

Inventor:-
Per Gunnar Palmgren
by his Attorneys
Howson & Howson

Patented Sept. 23, 1952

2,611,670

UNITED STATES PATENT OFFICE 2,611,670

ROLLER BEARING CAGE WITH CLOSED-IN FACE SLOT

Per Gunnar Palmgren, Philadelphia, Pa., assignor to SKF Industries, Inc., Philadelphia, Pa., a corporation of Delaware Application March 21, 1949, Serial No. 82,590

5 Claims. (Cl. 308—217)

This invention relates to cages in roller bearings, which act to keep roller axes in alignment with the bearing axis and also to retain rollers in unitary assembly with inner races.

One object of this invention is to provide a cage for roller bearings, producible economically in small quantities, that will guide the rollers and retain them in unitary assembly when the inner race becomes displaced outside the confines of the outer race.

Another object is to provide a cage for roller bearings having drilled pockets obstructed at their outboard ends by a piece removable for the purpose of permitting assembly and disassembly of the rollers.

The cage disclosed in this invention acts not only to separate the rollers but also to guide them against misalignment. It offers special utility in double row roller bearings. While the construction disclosed will achieve the same objectives with other types of roller bearings, it applies particularly well to spherical roller bearings which are used herein for illustration.

In the attached drawings:

Fig. 1 is a radial plane section of a spherical roller bearing equipped with the single bent tang type cage of the invention;

Figs. 2 and 3 are a radial plane section and end view respectively of a cage showing tangs formed by slotting each face of the cage;

Fig. 4 is an enlarged fragmentary sectional view of the cage showing the tang bent once to contact the roller;

Fig. 5 is an end view of Fig. 4 viewed along the roller axis;

Fig. 6 is a sectional view on the line 6—6, Fig. 4;

Fig. 7 is a fragmentary radial plane sectional view of a spherical roller bearing equipped with a cage of double bent tang type;

Fig. 8 is an end view of Fig. 7 viewed along the roller axis;

Fig. 9 is a sectional view on the line 9—9, Fig. 7;

Figure 10:
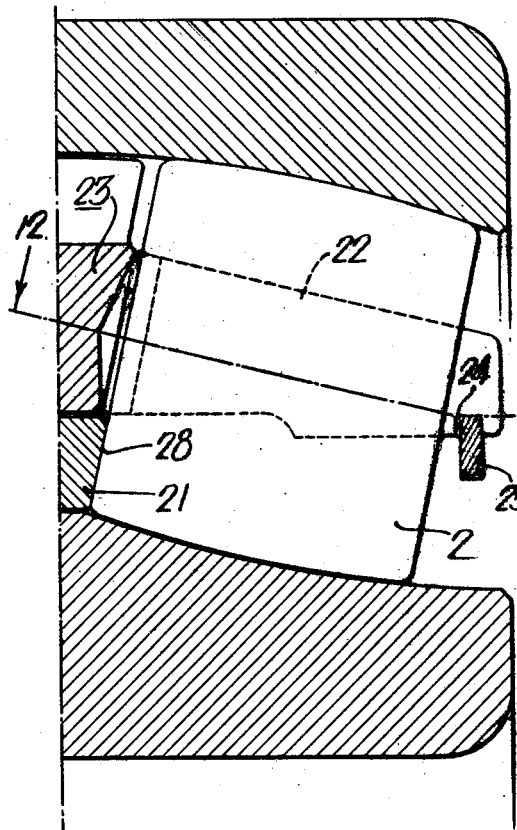
Fig. 10 is a fragmentary radial plane sectional view of a spherical roller bearing equipped with a cage which includes an obstructing ring in an outboard slot to retain the rollers in the cage pockets.

The double row spherical roller bearing used to illustrate this invention (see Figs. 1 to 6 inclusive) comprises an inner ring 1, two rows of rollers 2, and outer race 3, having the raceway 4 in the form of a sphere whose center coincides with the center of the bearing, and a cage 5, having staggered pockets 6 on the opposite sides of its central plane for receiving and spacing the rollers. The cage also, by means of this invention, guides and/or retains the rollers in unitary assembly with the inner race.

The cage may originate either as a casting or piece of tubing. In either case a drill boring into the face of the cage at an angle corresponding with the position of the roller axis in the assembled bearing, cuts out the pockets 6 somewhat deeper than the length of the roller. Each pocket has a shoulder 7 near its inner end which may be cut out by a corresponding formation on the drill. Between each adjoining pair of pockets a slot 8 cut into the outboard face of the cage forms a tang 9, the function of which will be hereinafter described.

The bearing of this embodiment contains rollers termed "symmetrical," which means that they have equal load carrying length on each side of their central plane and that the effective line of action of the load lies entirely within that plane so that the rollers when rolling in proper alignment impose no thrust in either direction along their axes. Minute dimensional imperfections and the commonly existing unsymmetrical loading, both tend to turn the rollers as on an axis, around the line passing through the centers of the inner and outer contact areas. Misalignment increases friction, operating temperatures and wear.

The cage of this invention keeps the rollers in alignment by providing three widely separated points of contact 10, 11 and 12 between rollers and cage (see Fig. 6). Wide spacing of these points reduces the pressure required at each point for maintaining alignment. The rollers are not only guided against misalignment but are also retained in their pockets even when the inner race assembly turns aside far enough to bring the rollers entirely outside of the spherical surface of the outer raceway.

When assembling to form a unit with the inner race, the rollers slide endwise into the pockets in which they fit with enough play to permit them to rise over the edge of the inner race, which can only take place with the race turned angularly outside of the outer race. Turning the assembly back within the outer race will keep it intact. Since the walls of the drilled pockets have a cylindrical form, they can contact the rollers only at their largest diameters and at their inboard ends. This provides a maximum separation of guide points equal at best to only one-half roller length. The invention doubles the separation distance by establishing a third point of contact 12 at the outboard end of each roller.

After assembling the rollers in the pockets the tangs 9 are bent radially inwardly to close the slots at the ends. Because of the circular form of the pockets and because that portion of the pocket circle from which the slot extends, lies radially outside of the roller axis at the outboard face of the cage, the outer and broadest portion of the tang will touch the roller close to the end thereof as illustrated on an enlarged scale in Figs. 4, 5 and 6. Section 6—6 shows the roller against one side of the pocket touching the latter at points 10, 11 and 12. 10 contacts the edge of shoulder 7 formed in the pocket by the drill. 11 represents the roller's large diameter contacting with the pocket bore, 12 represents a point on a circle on the outboard end of the roller just inside the rounded end of the roller. The elevation view (Fig. 4) shows 10 and 11 in a plane through the axis of the pocket, and 12 in a plane outwardly removed therefrom. Since the arcuate pocket wraps around the roller and the width from tip to tip of adjoining tangs is less than the width of the mid-section of the roller, the latter will remain in assembled position with the inner race regardless of its angular position with respect to the outer race.

The above-described embodiment may have modifications to suit other proportions of bearing, cage and rollers than those shown in Figures 1 to 6. In one such modification, each face of the cage is cut away radially inwardly of the tang, so as to provide room inside the boundaries of the bearing, in which to bend the end of the tang. This is illustrated in Figs. 7, 8 and 9 wherein the essential elements of the bearing, including the inner and outer races, 1 and 3 respectively, and the rollers 2, have been identified by the same reference numerals employed in the previously described embodiment. The cage 13 in this instance has extended tangs 14 at the outboard ends (shown in dotted lines) which are adapted to be bent radially inward, as shown in full lines, so as to overlap the outboard ends of the rollers in the adjoining pockets. In the present instance the tangs are undercut by slots 15 so that the displacement of the tang into the full line operative position takes place in effect in two bends—one at the base of the tang as indicated at 16, and the other at the mid-section 17. This is desirable when the rollers being relatively short have a mid-section diameter too small in comparison with the width across the bent tangs to retain the roller located with sufficient accuracy in the endwise direction.

In the operative position the tang 14 rests against the lower portion of the outboard face of the cage. As shown in Fig. 8 the tang is greater in width than the space between the adjoining roller pockets so that the tang overlaps the ends of the rollers, as described above, thus positively preventing them from moving axially from the pockets. It will be noted by reference to Fig. 9 that in this case also the pockets are formed and are relatively proportioned with respect to the rollers so that the rollers will contact the cage at points 18, 19 and 20, corresponding to the points 10, 11 and 12 of the previously described embodiment. The modification illustrated in Figs. 7, 8 and 9 is well suited to bearings employing short rollers and those whose lengths do not exceed their diameter by more than a small amount.

Figure 11:
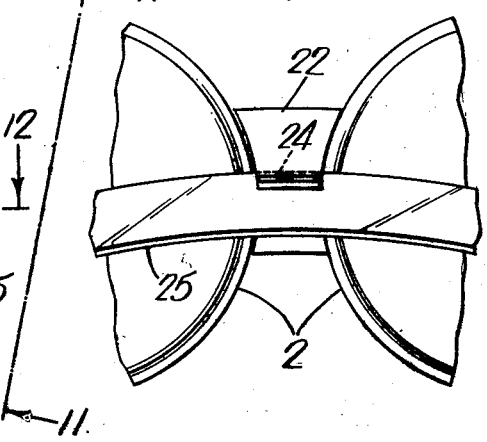
Fig. 11 is an end view of Fig. 10 viewed along the roller axis.
Figure 12:
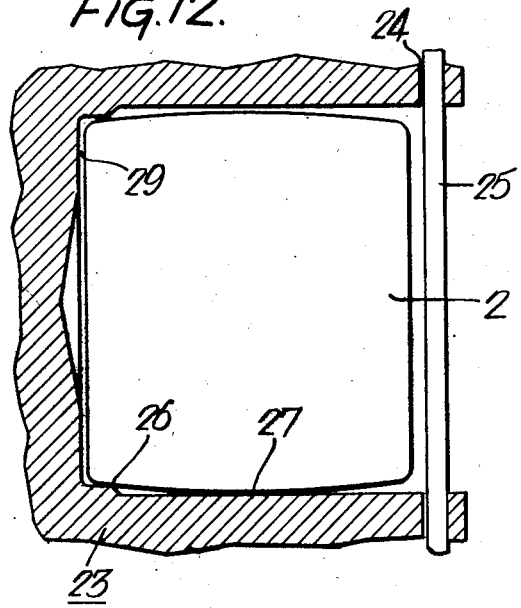
Fig. 12 is a sectional view on the line 12—12, Fig. 10.

The embodiment of the invention illustrated in Figs. 10 to 12 inclusive applies preferably to bearings employing rollers of the shortest type and/or to bearings having a central thrust flange or separate ring as indicated at 21 in Fig. 10 which assists in maintaining roller alignment. In this case the arms 22 of the cage 23, which define the sides of the roller pockets, are provided each with a slot-like recess 24 in the inner side, i. e., the side which confronts the axis of the bearing, these recesses being at the outer ends of the arms and extending in a radial direction. In assembly these recesses receive a snap or other ring 25 which, when in place, acts to prevent the rollers 2 from moving axially out of the pockets. The rings may be detached from the cage so that the rollers may be readily removed from the cage when desired. In this case, with reference to Fig. 12, the rollers will be guided by the cage at points 26 and 27 only, but may also contact the surface 28 of the inner thrust ring or flange 21 referred to above.

Figure 13:
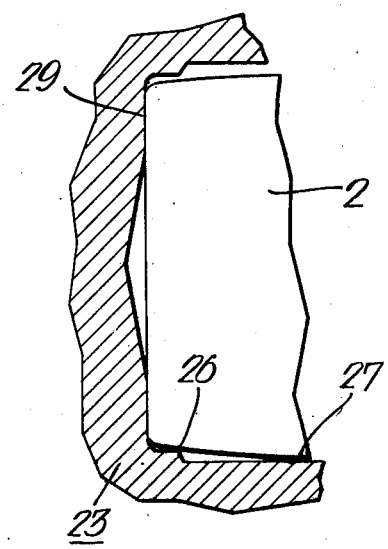
Fig. 13 is a fragmentary sectional view corresponding to Fig. 12 but showing the roller in a different position in the cage.

In the absence of a flange or separate thrust ring, the inboard end of the roller may contact the inner end surface 29 of the pocket, as shown in Fig. 13. The latter contact will act in a manner similar to a central flange or separate ring, to prevent skewing of the rollers.

This invention provides a solid metal cage adaptable to spherical roller bearings designed for pressed metal cages as standard equipment. It interchanges with pressed cages without requiring any modification of races to accommodate it.

While the cage of this invention may go into any roller bearing, it finds its most useful applications for example:

(1) In bearings wherein heavy loads would overstrain and break down too rapidly a relatively weaker pressed cage;

(2) In bearings subjected to vibrational or eccentric movements, which require that the cage ride on one of the races with a close running clearance, to relieve the pockets from radial pressure that would deteriorate the roller-fits therein by too rapid wear;

(3) In bearings wherein required only in quantities too small to justify the great expense of making complicated dies for pressed cages.

This invention also provides a solid metal cage capable of guiding the rollers (keeping their axes in alignment with the bearing axis) without the help of a central guide flange and capable of preventing the rollers from moving axially out of their pockets without the assistance of an outboard flange, or of a ring in an outboard raceway slot. This means that this invention saves manufacturing expense by eliminating the central flange and thus permitting the use of smaller, less expensive tubing for making the inner race, and by eliminating the cost of machining and grinding that flange. It also saves the cost of machining and grinding an outboard flange, or snap ring slot, and by adapting itself to standard roller bearings in such cases as those mentioned just above, and others.

I claim:

1. A roller bearing cage having projecting relatively spaced arms forming therebetween an open ended roller receiving pocket, the confronting faces of said arms being concave and defining the opposite sides of a common cylinder whose axis extends longitudinally of and between the arms, and the outboard end of at least one of said arms having a slot intersecting the said concave surface of the arm, said slot forming a tang on the said outboard end of the arm adapted for displacement in a direction to close the slot and when so displaced projecting into the side of the cylindrical pocket space to thereby obstruct the open end of the pocket.

2. A roller bearing cage having projecting relatively spaced arms forming therebetween open ended roller receiving pockets, the confronting faces of each adjoining pair of arms being concave and defining the opposite sides of a common cylinder whose axis extends longitudinally of and between the arms, and the outboard ends of said arms having slots intersecting the said concave surfaces, said slots forming tangs on the said outboard ends adapted for displacement in a direction to close the slots and when so displaced projecting into the sides of the adjoining cylindrical pocket spaces to thereby obstruct the open ends of the pockets.

3. A roller bearing cage consisting of an annular body member having circumferentially spaced arms extending from an axial side thereof, the spaces between adjoining pairs of arms constituting roller receiving pockets and the confronting faces of said pairs of arms being concave and defining the opposite sides of a cylinder conforming to the circular cross sectional contour of the said rollers, the outboard ends of the arms having slots intersecting the said concave faces and forming tangs the side edges of which, when the tangs are bent to close said slots, will project into the cylindrical sides of the proximate cylindrical pocket spaces to obstruct the open ends of the pockets.

4. A roller bearing comprising a cage having projecting relatively spaced arms forming therebetween open ended roller receiving pockets, the confronting faces of each adjoining pair of arms being concave and defining the opposite sides of a common cylinder whose axis extends longitudinally of and between the arms, rollers mounted in said pockets and confined radially in the concave sides thereof, said rollers having an end portion of reduced diameter adjoining the outboard ends of said arms, and said outboard ends having slots intersecting the said concave faces and forming tangs on said outboard ends, said tangs being displaced into the respective slots and thereby having their side edge portions projecting into the sides of the adjoining cylindrical pocket spaces and into proximity to sides of the reduced end portions of the rollers so as to obstruct the open ends of the pockets and to retain the rollers against axial displacement from the latter.

5. A roller bearing comprising a cage having projecting relatively spaced arms forming therebetween open ended roller receiving pockets, the confronting faces of each adjoining pair of arms being concave and defining the opposite sides of a common cylinder whose axis extends longitudinally of and between the arms, rollers in said pockets, each said roller being formed with a portion of major diameter closely fitted to the said concave sides and having an end portion of lesser diameter and being disposed in the pocket with the said end portion in proximity to the outer end of the pocket, tangs on the outer ends of the arms extending from points inwardly of the outer ends of the pockets and offset into close proximity to the sides of the rollers in the areas of lesser diameter so as to retain the rollers in the pockets.

PER GUNNAR PALMGREN.

REFERENCES CITED

The following references are of record in the file of this patent:

UNITED STATES PATENTS

| Number | Name | Date |
| --- | --- | --- |
| 1,464,666 | Slater | Aug. 14, 1923 |
| 1,668,112 | Gibbons | May 1, 1928 |
| 1,901,967 | Hoover | Mar. 21, 1933 |
| 1,915,585 | Wingquist | June 27, 1934 |
| 2,010,050 | Ackerman | Aug. 6, 1935 |
| 2,454,028 | Baker | Nov. 16, 1948 |

FOREIGN PATENTS

| Number | Country | Date |
| --- | --- | --- |
| 5,006 | Great Britain | 1894 |
| 410,891 | Great Britain | May 31, 1934 |